No. 870,124. PATENTED NOV. 5, 1907.
O. PERSEN.
FRUIT JUICE EXTRACTOR.
APPLICATION FILED JUNE 12, 1907.

Witnesses
J. G. Stinkel
S. K. Sedney.

Inventor
Ole Persen
By Horace H. Clark
Attorney

UNITED STATES PATENT OFFICE.

OLE PERSEN, OF FORTUNA, CALIFORNIA.

FRUIT-JUICE EXTRACTOR.

No. 870,124.  Specification of Letters Patent.  Patented Nov. 5, 1907.

Application filed June 12, 1907. Serial No. 378,555.

*To all whom it may concern:*

Be it known that I, OLE PERSEN, a citizen of the United States, residing at Fortuna, in the county of Humboldt and State of California, have invented certain new and useful Improvements in Fruit-Juice Extractors, of which the following is a specification.

My invention relates to extractors for the juice of lemons, oranges, and similar fruit, and has for its object the provision of a device which will efficiently extract the juice of such fruit, strain the pulp and seeds therefrom, and act as a funnel to conduct said juice into the mouth of a bottle or similar receptacle.

In some lines of business, and in general under some circumstances, it is desirable to extract a large amount of fruit juice and place the same in bottles for future use. In doing this it is the general custom to extract the juice by squeezing or otherwise, then strain it, and then by means of a funnel introduce it into the bottles in which it is to be set aside. This requires three distinct operations and involves the use of several utensils and the loss of a considerable amount of time.

In carrying out my invention I provide a single device for effecting the above operations simultaneously, the juice being expressed and then passing through first a coarse and then a fine strainer and then directly into the bottle to be filled.

My invention is illustrated in the accompanying drawings, in which

Figure 1:
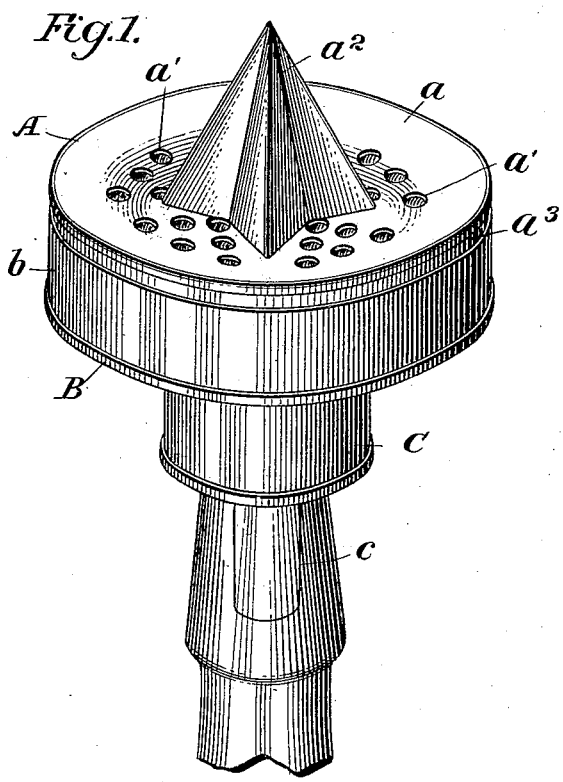
Figure 2:
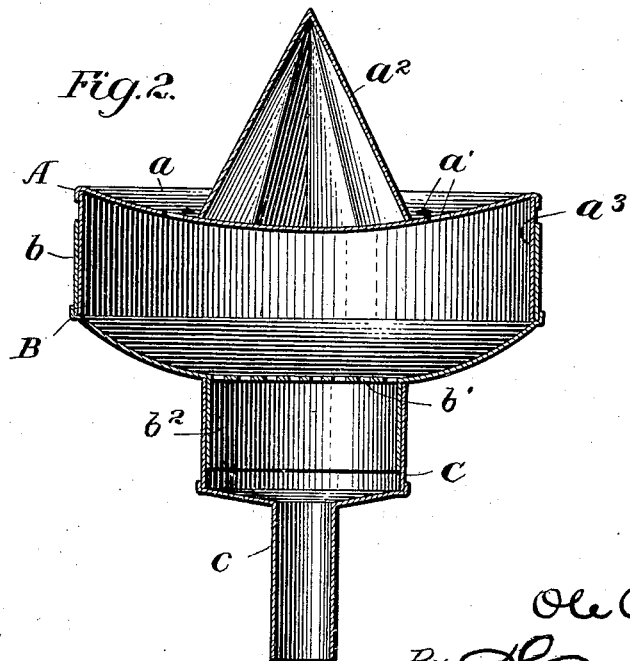

Figure 1 is a perspective view of the device in the position of use in connection with a bottle, the neck only of which latter is shown; and Fig. 2 is a central vertical section through the device.

Referring to the drawings it will be seen that the device consists of three separable parts A, B and C. The part A consists of a dished upper surface $a$ provided with coarse strainer perforations $a'$ and having secured centrally a conical projection $a^2$ having ridges upon which the fruit is pressed for the purpose of extracting the juice. A rim $a^3$ extends downwardly from the dished portion $a$ and forms a flange which telescopes with the body portion $b$ of the second part B of the device. The central portion of the bottom of part B is formed with a second strainer $b'$ having a finer mesh than the strainer openings $a'$ of part A for the purpose of removing such pulp and the small seeds which may pass through the former openings. Below this fine strainer $b'$ a flange $b^2$ extends downwardly and telescopes with the body portion of the third member C. This third member C is provided with a tubular projection $c$ of considerable length with respect to its diameter for the purpose of extending into the neck of a bottle and more or less assisting in steadying the device while the juice is being extracted.

The use of the device will be apparent from the drawings and the foregoing description. A section of the fruit, such as the half of a lemon, is pressed upon the conical projection $a^2$ and the juice and a considerable amount of the pulp runs down into the dished upper surface $a$ of the part A. Here the coarse strainer acts to remove the large seeds and the greater portion of the pulp. Such of the pulp and the small seeds as pass into the second part B with the juice are removed from the juice as the latter passes through the fine strainer $b'$. The juice then passes through the tubular projection $c$ directly into the bottle. It will thus be seen that the device saves considerable labor and time, and serves to extract, strain and deposit the juice directly and expeditiously where it is desired.

The three parts are readily separable for the purpose of cleaning and to allow access to the second or fine mesh strainer $b'$ to remove such pulp and seeds as are collected there.

The device is preferably constructed of sheet metal such as copper, either with or without a coating of tin, and is very durable.

Having described my invention, what I claim as new and desire to secure by Letters Patent of the United States, is—

1. A juice extractor comprising three separable parts, the first part having a dished upper surface provided with strainer openings and having an expressing conical projection, the second part engaging the first part and provided with a strainer of fine mesh, and the third part having a body portion engaging the second part and an elongated tubular projection adapted to extend into the neck of a bottle, substantially as described.

2. A juice extractor comprising three separable parts having a telescoping connection, the first part having a dished upper surface provided with coarse mesh strainer openings and having a centrally located expressing conical projection, the second part having a fine mesh strainer in the bottom thereof, and the third part having a telescoping connection with the second part and provided with an elongated tubular projection adapted to extend into the neck of a bottle, substantially as described.

In testimony whereof I have signed my name to this specification in the presence of two subscribing witnesses.

OLE PERSEN.

Witnesses:
J. H. G. WEAVER,
J. L. BLACK.